UNITED STATES PATENT OFFICE.

ADOLPH FRANK, OF CHARLOTTENBURG, PRUSSIA, GERMANY.

PROCESS OF MANUFACTURING POROUS SILICIOUS MATERIALS TO BE USED AS FIRE-BRICKS, FILTERS, &c.

SPECIFICATION forming part of Letters Patent No. 287,817, dated November 6, 1883.

Application filed February 8, 1883. (No specimens.) Patented in Germany December 6, 1881, No. 21,074; in England January 16, 1883, No. 254, and in France June 23, 1883, No. 153,868.

*To all whom it may concern:*

Be it known that I, ADOLPH FRANK, doctor of philosophy, a subject of the King of Prussia, residing at Charlottenburg, Prussia, German Empire, have invented certain new and useful Improvements in the Process of Manufacturing Porous Silicious Materials to be Used as Fire-Bricks, Filters, and for other Purposes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has for its object the manufacture of a solid and very porous material adapted for use as hereinafter more specifically set forth, and having silicic acid or silicious earth as a basis, whether artificially prepared or natural.

In carrying out my invention I mix artificial or natural finely-divided silicious earth (of which latter I preferably employ what is termed "fossiliferous earth" or "fossil meal") with compounds of organic substances, alkalies, or alkaline earths, in which latter I also include magnesia. From such compounds I form, with the addition of water or other suitable fluids, masses which may be molded, dried, and then burned or baked. By the action of heat upon the organic constituent or constituents of the compound these are charred, and the resulting carbon either wholly or partially consumed, according as the burning or baking is effected in the presence or in the absence of atmospheric air, and the silicic acid caused to combine partially with the refractory bases, resulting in the formation of silicates, by which they are fritted together, the product of this process being a highly-porous yet comparatively-solid body.

Instead of combining organic substances with alkalies or alkaline earths, organic acids or neutral substances or bodies may be combined therewith—as, for example, tartrate of potash or tartrate-of-potash soda, (weinsaures kali natron,) or sugar of lime, and other suitable or analogous substances too numerous to enumerate here in detail, the principles involved in my invention and the method of proceeding remaining, however, the same—namely, to prevent during the process of vitrification the compacting or running together into a solid mass of the particles of silicic acid by the admixture of substances that during the incineration or burning will generate gases or gaseous products. The quantity of alkalies or alkaline earths, or of magnesia, or of combinations of these bases, employed varies according to the temperature under which the compounds are burned, and also according to the porosity the final product is to have. If the burning is effected at very high temperatures, I employ comparatively little silicious earth—say from five one-hundredths to one per cent. of the weight of the compound. If, on the contrary, the burning is effected at low temperatures, then I increase the proportions of the bases correspondingly. Of the so-called inorganic combination of the described bases I employ, especially, the carbonic acid, sulphuric acid, nitric acid, as well as the chlorine and fluorine bases. From all these combinations the silicic acid sets the bases free both by the influence of the heat and the action of steam and reducing substance, and combines with it. I also employ boracic-acid and basic silicic-acid combinations—such as, for example, borax, soluble silicate of potash, various cements, &c.—and these are capable of combining with still greater quantities of silicic acid.

Of the organic substances, or substances of organic origin, I preferably employ those free from nitrogen—such as sugar, starch, pulverized wood, tar, &c.; and of the nitrogenous substances blood, gluten, glue, bone-meal, &c., may be employed.

The solid porous bodies obtained from one or the other of the compounds named may for certain purposes have their surfaces either partially or wholly glazed by exposing them while still at a white heat to alkaline vapors either in the kiln itself or in specially-constructed furnaces, or by coating their surface with other glazing or vitrifying substances or compounds. By means of the latter process these products are rendered wholly or partially liquid-proof, and if employed for purposes of filtration or absorption of liquids such liquids will not percolate through all sides thereof. Such products embody the following characteristic properties: They are refractory in the highest degree; they are very light—i. e., of little specific gravity; they are non-conductors of heat and sound; the component particles of silicous earth of such bodies are extremely hard, which hardness may be regulated according to the purposes for which such bodies are employed; they are extremely porous, and consequently possess corresponding absorbing capacities; and, lastly, these characteristic qualities adapt such bodies for various uses—as, for example, for furnace-linings and for other structures where fire-proof materials are required or desired, as they possess refractory qualites equal to the best Dinas quartz-rock, while their weight is not quite one-third that of the latter, and are not as good conductors of heat as the said Dinas stones; and owing to the latter qualities such products may be employed as non-conductors of heat for furnaces, boilers, and steam-conduits. Owing to their comparatively small specific gravity (about one-third that of ordinary bricks) these bodies are admirably adapted for light fire-proof structures—such as partition-walls in dwellings, manufactories, and public buildings—as well as in vessels, or for linings for walls of buildings, or for other light fire-proof structures. Owing to their non-conductivity of sound they may be advantageously employed for telephone-cells, for instance, or chambers where a number of telephones are located in proximity to one another; and to render these bodies water-proof I glaze their surfaces, either wholly or partially, as hereinabove set forth. Owing to the great porosity of these bodies they are particularly well adapted as a filtering material for liquids or gases, especially as they are composed of almost pure silicious earth, and therefore proof against the action of many acids that would attack any other substance. In order to add to the properties above described—that of carbon, namely, the property of decoloration—these bodies are burned in air-tight furnaces or kilns, as already stated, so that the carbonized organic substances will be left within the pores or cells thereof, and as the carbon, especially that obtained from nitrogenous substances, is especially efficacious—as, for example, the carbon obtained by carbonizing blood—the incorporation of such substance into the mass will therefore impart to it decolorating properties in a very high degree. If the material becomes choked when used for filtering purposes, and therefore inoperative, it may be readily washed, dried, and burned again; or if used for filtering and decolorating again soaked with blood and the latter carbonized within the pores or cells and upon the surfaces thereof.

In the construction of filters or filtering-columns, in which the liquid or gas is to pass in a given direction, those surfaces of the material from which the passage of such liquid or gas is to be excluded are glazed, as above set forth. The great hardness of the particles of silicious earth—hardness, which may be regulated in the operation of burning—adapts these bodies for use in the art of grinding, cutting, or polishing metals, glass, and other substances. The great porosity of these bodies, consequently their great absorbing properties for liquids, which, with but few exceptions, are not affected chemically thereby, make them available for the manufacture of solid explosives, such as dynamite or nitro-glycerine cartridges, in the pores or cells of which the explosive may be hermetically sealed by glazing the entire surface thereof. This absorbing capacity makes them available also for periodical or continuous absorption of petroleum for use as a combustible for heating purposes, as well as a means of transportation for sulphuret of carbon, of which such body is capable of absorbing nearly twice its own weight, thus forming dry and easily-handled masses. These bodies, inasmuch as they hold the sulphuret of carbon, and only part with it gradually by evaporation, may be employed as a protection for vines against the ravages of the phylloxera by burying bricks impregnated with the sulphuret around the vine close to its roots, in which condition the sulphuret is slowly given off, and when the bricks are exhausted they may be removed and impregnated again. The material may likewise be used for the absorption and transportation of bromine, of which it is capable of absorbing five times its own weight, and form a dry body. The material so charged with bromine may be employed for disinfecting rooms, vessels, merchandise, and other goods, and live as well as dead human beings and animals, for medicinal as well as chirurgical operations, and for forming solutions of bromine. After having parted with its absorbed bromine, it is capable of again being charged with it, as it is not affected thereby. Concentrated sulphuric acid, fuming nitric acid, as well as many other fluid acids, can be absorbed by the material, and thus transported without danger and used for many purposes.

Having thus described my invention, what I claim is—

1. The herein-described process of obtaining refractory porous bodies, which consists in mixing artificial or natural finely-divided silicic acid (in the latter case preferably fossil-meal or fossiliferous earth) with an alkali or its equivalent and an organic substance, and subjecting the compound to the action of heat in presence of atmospheric air, to frit the mass and consume the organic substance, as described, for the purposes specified.

2. The herein-described process of obtaining refractory porous bodies, which consists in mixing artificial or natural finely-divided silicic acid (in the latter case preferably fossil-meal or fossiliferous earth) with an alkali or its equivalent and an organic substance, and subjecting the compound to the action of heat without admission thereto of atmospheric air to frit the mass and carbonize the organic substance, substantially as and for the purposes specified.

3. A solid porous body composed, essentially, of silicic acid and an alkali or its equivalent, substantially as and for the purposes specified.

4. A solid porous body composed, essentially, of silicic acid and an alkali or its equivalent, having its pores charged with carbon, substantially as and for the purposes specified.

5. A solid porous body composed, essentially, of silicic acid and an alkali or its equivalent, having its outer surface or surfaces glazed or vitrified in part or in whole, substantially as and for the purposes specified.

In testimony whereof I affix my signature in presence of two witnesses.

ADOLPH FRANK.

Witnesses:
G. LOUBIER,
B. ROI.